(12) United States Patent
Vogel

(10) Patent No.: US 9,431,809 B2
(45) Date of Patent: Aug. 30, 2016

(54) ANCHORING DEVICE

(71) Applicant: XSPlatforms Holding B.V., Gorinchem (NL)

(72) Inventor: Matthijs Vogel, Rotterdam (NL)

(73) Assignee: XS Platforms Holding, BV, Gorinchem (NL)

( * ) Notice: Subject to any disclaimer, the term of this patent is extended or adjusted under 35 U.S.C. 154(b) by 20 days.

(21) Appl. No.: 13/741,373

(22) Filed: Jan. 14, 2013

(65) Prior Publication Data
US 2014/0027583 A1    Jan. 30, 2014

(51) Int. Cl.
| | | |
|---|---|---|
| A47L 3/04 | (2006.01) |
| A62B 1/16 | (2006.01) |
| A62B 35/00 | (2006.01) |
| A63B 29/02 | (2006.01) |
| E06C 7/18 | (2006.01) |
| H02G 3/30 | (2006.01) |
| E04G 21/32 | (2006.01) |
| E04D 13/12 | (2006.01) |
| E04G 1/36 | (2006.01) |
| E04G 3/26 | (2006.01) |
| E04G 3/34 | (2006.01) |
| A47B 96/06 | (2006.01) |
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |
| A47G 29/02 | (2006.01) |
| E04G 3/20 | (2006.01) |
| E06B 7/28 | (2006.01) |
| A62B 1/04 | (2006.01) |
| A62B 35/04 | (2006.01) |

(52) U.S. Cl.
CPC ............. *H02G 3/30* (2013.01); *A62B 35/0056* (2013.01); *A62B 35/0068* (2013.01); *A62B 35/0087* (2013.01); *E04D 13/12* (2013.01); *E04G 21/329* (2013.01); *E04G 21/3261* (2013.01); *E04G 21/3276* (2013.01); *E04G 21/3295* (2013.01); *A62B 1/04* (2013.01); *A62B 35/04* (2013.01)

(58) Field of Classification Search
CPC ....... A47G 25/0664; A47F 5/04; A47F 5/02; A47F 5/106; D06F 57/04; E04G 21/3261; E04G 21/3276; E04D 13/12; A62B 1/04; A62B 35/04; A62B 35/0068
USPC ............ 248/127, 148, 158, 536, 219.1, 237; 182/3, 45; 211/33, 196, 205
See application file for complete search history.

(56) References Cited

U.S. PATENT DOCUMENTS

| | | | | |
|---|---|---|---|---|
| 3,312,020 | A | * | 4/1967 | Schuster ........................ 52/108 |
| 7,537,085 | B2 | * | 5/2009 | Vetesnik ........................... 182/3 |
| 2007/0144830 | A1 | * | 6/2007 | Mastenbroek .................... 182/3 |

FOREIGN PATENT DOCUMENTS

WO    WO2008/151397    12/2008

*Primary Examiner* — Syed A Islam
*Assistant Examiner* — Taylor Morris
(74) *Attorney, Agent, or Firm* — Eric Karich; Karich & Associates

(57) ABSTRACT

An anchoring device for fastening guide wires on a roof has a base. The base has a mounting surface, a support, and carriers to which the wire guides are attached. The carriers are rotatably connected to the support and can be fixed in any desired relative position to the support, so that the anchoring device has many possibilities for holding the guide wires. The support has a number of parts which are present between the carriers, whereby between two adjacent parts of one or more carriers can be clamped. The wire guides are at different distances d1 and d2 from the central axis of the support and are at distances D1, D2 and D3 from each other.

5 Claims, 3 Drawing Sheets

ANCHORING DEVICE

FIELD OF THE INVENTION

The invention relates to an anchoring device for attaching at least two guide wires to a wall or ceiling or on a roof, on each of the guide wires a runner is movable with a fuse cable for a person attached to it, which anchoring device comprises a base provided with a mounting surface, as well as a support attached to the base and one or more carriers to which at least wire guides are mounted for holding the guide wires.

STATE OF THE ART

Such an anchoring device is known from WO 2008/151397 A. This known anchoring device has two spaced-apart wire guides, each of which hold a guide wire. Each guide wire is suitable for guiding one or more runners to which persons via fuse wires are attached. So, two people can pass each other without having to be detached from the guide wire.

SUMMARY OF THE INVENTION

An object of the invention is to provide an anchoring device of the kind described in the preamble which offers more possibilities for holding guide wires than the known anchoring device. To this end, the anchoring device according to the invention is characterized in that the carrier or carriers are rotatably connected to the support and can be fixed to the support in any desired position. Because the carriers to which the wire guides are attached can be rotated and fixed in any desired position relative to the support, the anchoring device according to the invention provides many options for holding the guide wires.

The holding possibilities further increase when the support comprises at least two parts between which the carrier or carriers are present, wherein between two adjacent parts one or more carriers can be clamped.

In case the base and support are rotation symmetrical the orientation of the base does not have to be taken into account when attaching the anchoring device on a roof or on a wall or ceiling.

In order to let two people pass each other easily without the risk that the fuse wires interfere with each other, at least two of the wire guides are at different distances from the center line of the support. Furthermore for this purpose, in a direction parallel to the mounting plane at least two of the wire guides are at a distance from each other, and in a direction perpendicular to the mounting surface, at least two of the wire guides are preferably at a distance from each other.

BRIEF DESCRIPTION OF THE DRAWINGS

The invention will be elucidated more fully hereinbelow based on examples of embodiment of a flywheel module according to the invention either or not located in a drive mechanism of a vehicle while reference is made to the appended drawing figures, in which.

DETAILED DESCRIPTION OF THE DRAWINGS

Figure 1:
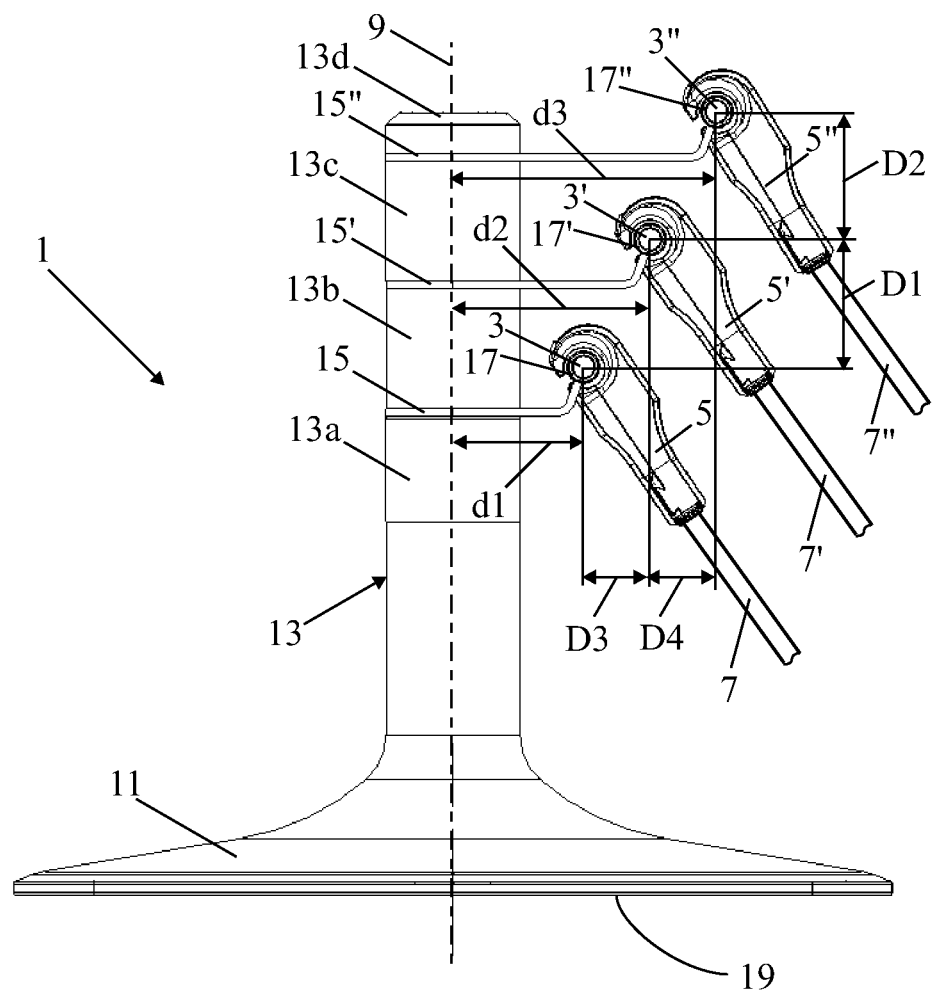
FIG. 1 shows a first embodiment of the anchoring device according to the invention for mounting on a roof.

In FIG. 1, a first embodiment of the anchoring device according to the invention for mounting on a roof is shown. Three guide wires 3, 3', 3" are attached to the anchoring device 1 over which runners 5, 5', 5" are movable. To each runner a fuse cable 7, 7', 7" for a person is attached. The anchor device 1 has a base 11 to which a support 13 is attached and which is provided with a mounting surface 19 with which it is fixed on the roof. The base 11 and the support 13 have a rotation-symmetrical shape. The support is composed of parts 13*a-d*, between which carriers 15, 15', 15" are clamped. At the free ends 17, 17', 17" of the carriers wire guides are attached for holding the guide wires. So, people can pass each other without thereby having to be detaching from the guide wires.

The carriers 15, 15', 15" are rotatably connected to the support 13 and can be fixed to the support in any desired position relative to the support. The wire guides 17, 17', 17" are at different distances d1, d2, d3 from the central axis 9 of the support 13. In a direction parallel to the mounting surface 19, the wire guides are at a distance D1 and D2 from one another, and in a direction at right angles to the mounting surface 19, the wire guides are at a distance D3 of each other.

Figure 2:
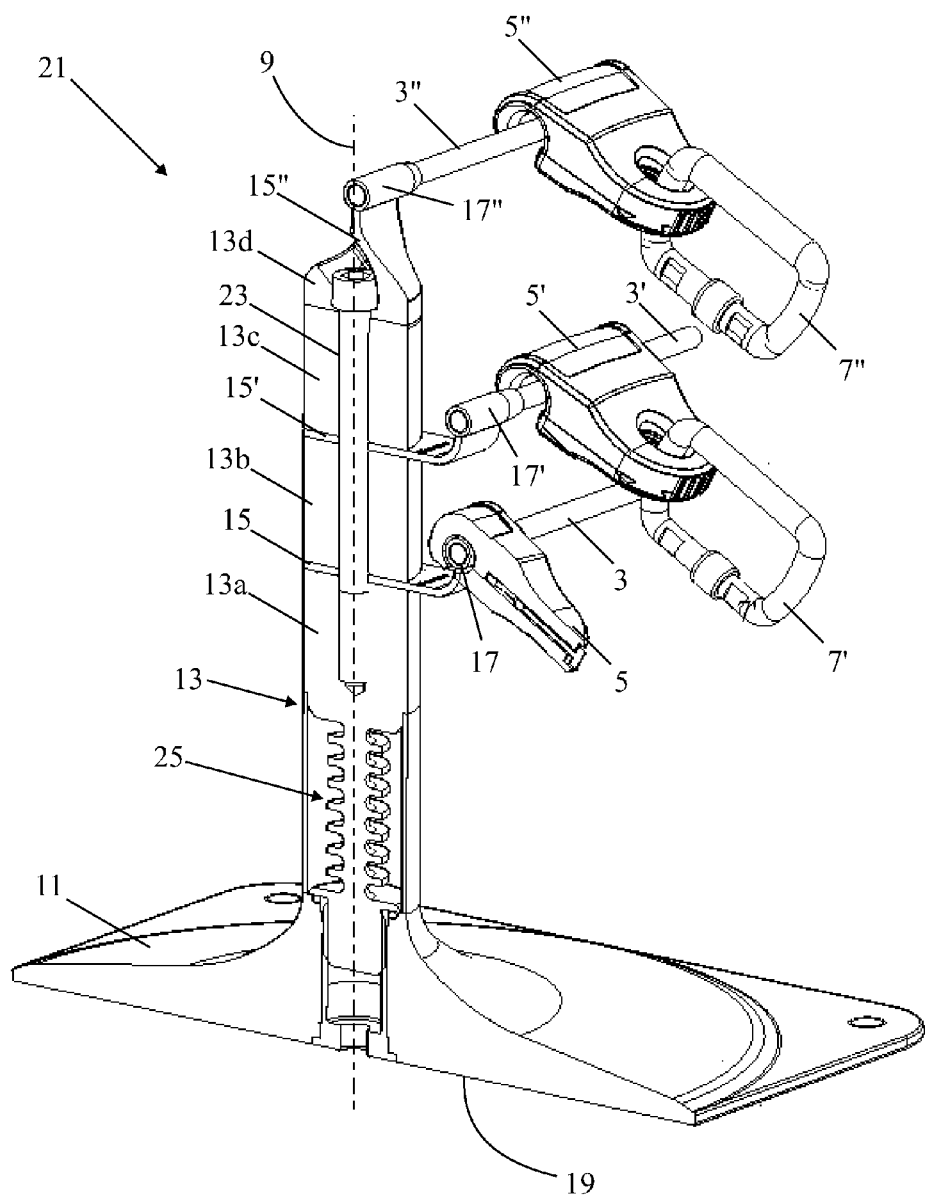
FIG. 2 shows a second embodiment of the anchoring device according to the invention for mounting on a roof.

In FIG. 2, a second embodiment of the anchoring device according to the invention for mounting on a roof is shown in cross-section. All parts that have the same function as those shown in FIG. 1 of the first embodiment are denoted by the same reference numerals. In this anchoring device 21, the wire guides 17 and 17' are at the same distance from the central axis 9 of the support 13 and the wire guide 17" is on top of the support 13 at the location of the center line 9.

In this cross section clearly can be seen that the parts 13*a-d* are tightened against each other by a bolt 23, and that in the lower part 13*a*, an energy-absorbing element 25 is present. The support 13 absorbs the energy of a person fallen. This person is captured with a jerk by the support 13 via the fuse cable 7 and the guide wire 3 and the energy of the fall is absorbed by the energy-absorbing element. The element 25 and the sleeve around this element will deform when a jerk is applied to the support 13 and thereby absorb energy.

Figure 3:
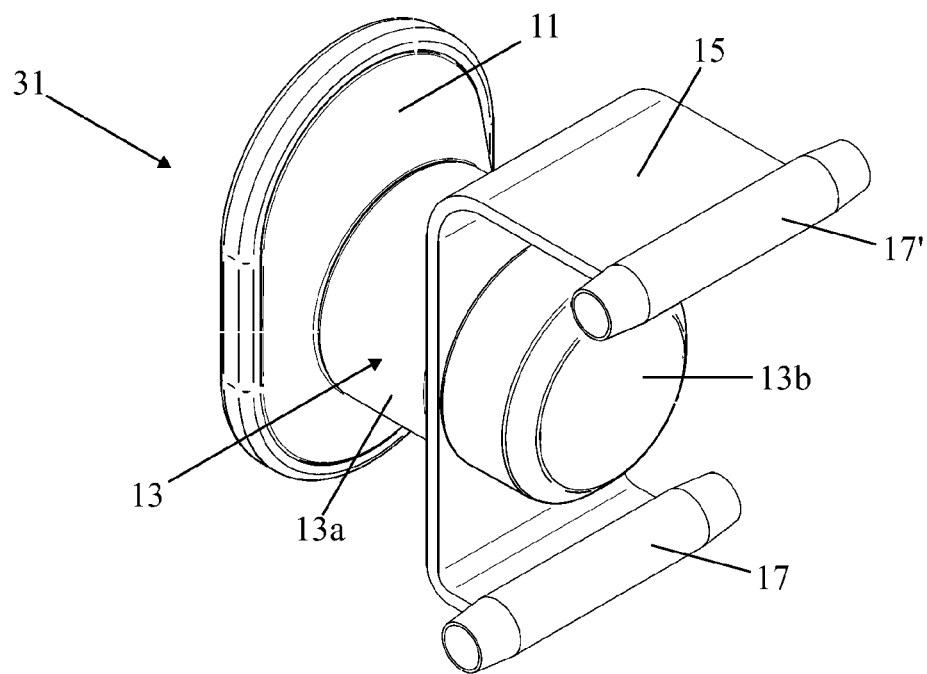
FIG. 3 shows a third embodiment of the anchoring device according to the invention for mounting on a wall or ceiling.
Figure 4:
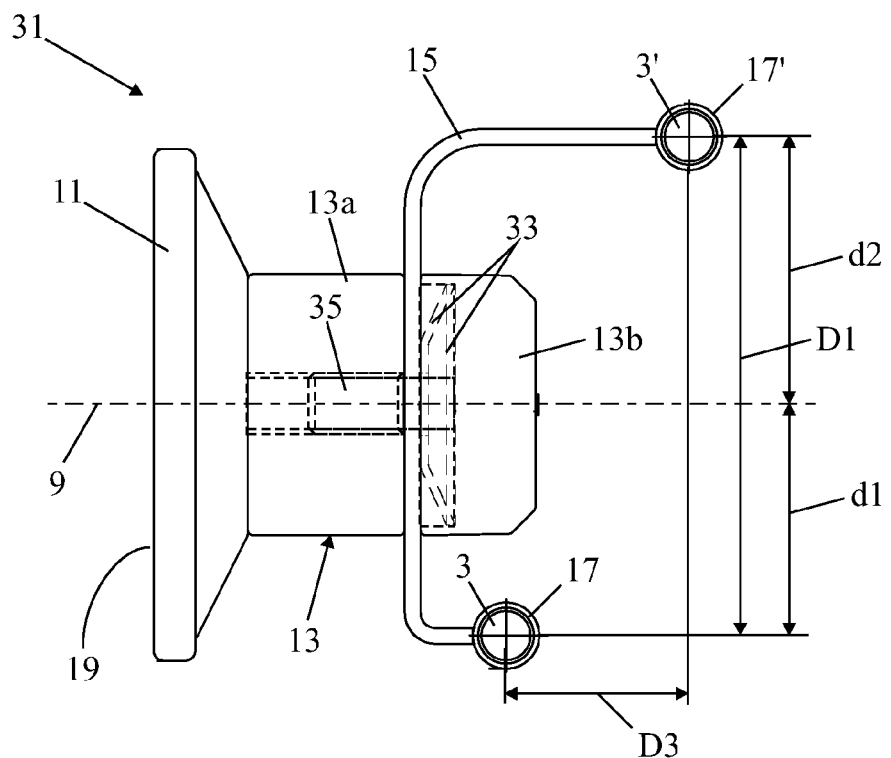
FIG. 4 shows the anchoring device shown in FIG. 3 in side view.

In FIGS. 3 and 4 a third embodiment of the anchoring device according to the invention is shown. All parts that have the same function as those shown in FIG. 1 of the first embodiment are again indicated by the same reference numerals. This anchoring device 31 is designed for mounting on a wall or ceiling and has two wire guides 17 and 17' which are mounted on one carrier 15. This carrier is clamped between the two parts 13*a* and 13*b* of the support 13, whereby one of the parts 13*b* has a threaded end 35 which is tightened in a threaded hole in the other part 13*a*. To absorb a fall disc springs 33 are located in the part 13*b*. The wall portion around the disc spring will deform when a jerk is applied on the support 13 and then the disc springs absorb the fall energy partially.

Also in this embodiment the cable guides 17 and 17' are at different distances d1 and d2 from the central axis 9 of the support 13. Also, in a direction parallel to the mounting surface 19 the wire guides are at a distance D1 from each other, and in a direction at right angles to the mounting surface 19 the wire guides are at a distance D3 of each other.

Albeit the invention has been described in the foregoing with reference to the drawings, it should be observed that the invention is not by any manner or means restricted to the embodiments shown in the drawings. The invention also extends to all embodiments deviating from the embodiments shown in the drawings within the scope defined by the claims.

What is claimed is:

1. An anchoring device for attaching at least two guide wires to a wall or ceiling or on a roof, on each of the guide wires a runner is movable with a fuse cable for a person attached to it, the anchoring device comprising:
    a base provided with a mounting surface;
    a support attached to the base, the support having a central axis;
    two or more carriers;
    at least two wire guides mounted to the carriers for holding the guide wires, wherein the carriers, at least at theft ends connected to the wire guides, are strips that are disposed on a plane,
    wherein the wire guides are hollow tubes, each having a fixed horizontal axis that is traverse to the central axis, through which the guide wires can be arranged and which extend in the plane of the strips to allow the runners to pass the wire guides and the carriers,
    wherein the carriers are rotatably connected to the support and can be fixed to the support in any desired position that is within reach of the carrier,
    wherein the at least two wire guides are at different distances from the central axis of the support,
    wherein, in a direction parallel to the mounting surface, the at least two wire guides are spaced a distance from each other,
    wherein, in a direction at right angles to the mounting surface, the at least two wire guides are at a distance from each other, and
    wherein the wire guides extend lengthwise in a direction perpendicular to the central axis of the support.

2. The anchoring device of claim 1, wherein the support comprises at least two parts, between which the carriers are present, wherein between two adjacent parts one or more of the carriers are clamped.

3. The anchoring device of claim 1, wherein the base and the support have a rotation-symmetrical shape.

4. An anchoring device for attaching at least two guide wires to a wall or ceiling or on a roof, on each of the guide wires a runner is movable with a fuse cable for a person attached to it, the anchoring device comprising:
    a base provided with a mounting surface;
    a support attached to the base, the support having a central axis;
    two or more carriers;
    at least two wire guides mounted to the carriers for holding the guide wires;
    wherein the carriers, at least at their ends connected to the wire guides, are strips that are disposed on a plane,
    wherein the wire guides are hollow tubes, each having a fixed horizontal axis that is traverse to the central axis, through which the guide wires can be arranged and which extend in the plane of the strips to allow the runners to pass the wire guides and the carriers;
    wherein the carriers are rotatably connected to the support and can be fixed to the support in any desired position that is within reach of the carrier; and
    wherein the at least two wire guides are at different distances from the central axis of the support.

5. An anchoring device for attaching at least two guide wires to a wall or ceiling or on a roof, on each of the guide wires a runner is movable with a fuse cable for a person attached to it, the anchoring device comprising:
    a base provided with a mounting surface;
    a support attached to the base, the support having a central axis;
    two or more carriers;
    wherein the support comprises a plurality of separate parts tightened against each other by a bolt, and the two or more carriers are individually clamped between the separate parts;
    at least two wire guides mounted to the carriers for holding the guide wires;
    wherein the carriers, at least at their ends connected to the wire guides, are strips that are disposed on a plane,
    wherein the wire guides are hollow tubes, each having a fixed horizontal axis that is traverse to the central axis, through which the guide wires can be arranged and which extend in the plane of the strips to allow the runners to pass the wire guides and the carriers;
    wherein the carriers are rotatably connected to the support and can be fixed to the support in any desired position that is within reach of the carrier; and
    wherein the at least two wire guides are at different distances from the central axis of the support.

* * * * *